United States Patent [19]

Goksel

[11] 4,219,519

[45] Aug. 26, 1980

[54] METHOD FOR AGGLOMERATING CARBONACEOUS FINES

[75] Inventor: Mehmet A. Goksel, Houghton, Mich.

[73] Assignee: Board of Control of Michigan Technological University, Houghton, Mich.

[21] Appl. No.: 18,651

[22] Filed: Mar. 8, 1979

[51] Int. Cl.$^2$ ............................................. C04B 15/14
[52] U.S. Cl. .................................... 264/82; 264/117; 23/314
[58] Field of Search ...................... 264/82, 117; 23/314

[56] References Cited

U.S. PATENT DOCUMENTS

| | | | |
|---|---|---|---|
| 3,275,724 | 9/1966 | Klingel | 264/82 |
| 3,634,567 | 1/1972 | Yang | 264/82 |
| 4,102,962 | 7/1978 | Matsui et al. | 264/82 |

*Primary Examiner*—Donald J. Arnold
*Assistant Examiner*—James R. Hall

*Attorney, Agent, or Firm*—Michael, Best & Friedrich

[57] ABSTRACT

Carbonaceous fines, such as coke fines, bituminous coal fines, anthracite coal fines, lignite fines, coal char, lignite char, wood char and mixtures thereof, are formed into hardened, crush-resistant agglomerates by preparing a moistened mixture including a major proportion of the carbonaceous fines, about 1 to about 15 weight % of a bonding agent, such as burned lime, CaO, or hydrated lime, Ca(OH)$_2$, and about 0.25 to about 10 weight % of a siliceous material, such as silica, having available SiO$_2$ for reacting with the bonding agent to form silicate or hydrosilicate bonds therewith; allowing the resulting mixture to stand a time period sufficient for a substantial portion of the free internal moisture in the pores of the carbonaceous fines to migrate to the surface thereof; forming the mixture into green discrete agglomerates; drying the green agglomerates to reduce the free moisture content therein to about 5% or less; and hydrothermally hardening the green agglomerates.

11 Claims, No Drawings

METHOD FOR AGGLOMERATING CARBONACEOUS FINES

BACKGROUND OF THE INVENTION

This invention relates to agglomeration and, more particularly, to agglomeration of carbonaceous fines, such as coke fines, bituminous and anthracite coal fines, lignite fines, coal char, lignite char, wood char and the like.

During production, handling and transportation of coke, substantial quantities of fines are generated. Material larger than about ¼ inch can be used for various applications, such as in charges for steel-making cupolas, blast furnaces and the like. However, smaller fines or breeze are not acceptable for such use and, consequently, usually are either sold at a substantially reduced price for lesser cost-effective uses or disposed of as a waste.

There are substantial quantities of bituminous and anthracite coal fines and lignite fines which presently have limited use because of the difficulty associated with handling, transportation, etc. Non-coking bituminous and anthracite coals and lignite are much more abundant than the special bituminous coal used for making coke. When these materials are heated to an elevated temperature to drive off the volatile ingredients, the resulting char is in a powder-like form instead of the cake-like form of coke and, thus, has limited use. In some countries having limited supplies of coking coal, charred wood is used in place of coke in various processes. Substantial quantities of wood char fines are generated during the charring process and these fines, like the others mentioned above, have limited use.

In order to broaden the applications for these valuable fine materials, there is an apparent need for a process capable of agglomerating them into hardened, crush-resistant pellets, briquettes and similar forms which can be conveniently handled, transported and used for a variety of purposes, including use as part of a charge to steel making processes. Some of these fine materials have been formed into briquettes using asphalt or tar binders and high pressure presses. The resulting briquettes are quite weak and tend to disintegrate during normal handling and transportation. Sintering processes commonly used for producing hardened, crush-resistant mineral agglomerates employ temperatures which are well above the combustion temperature of carbonaceous materials. Low temperature, hydrothermal processes have been used for agglomerating and hardening mineral ores and iron-rich steel plant wastes products which have relatively high inherent strengths. Such processes are exemplified in U.S. Pat. Nos. 3,235,371, 3,770,416 and 3,895,088. However, to the best of applicant's knowledge, this type process has not been used to agglomerate and harden materials containing a major proportion of combustible ingredient(s) having relatively low inherent strengths.

SUMMARY OF THE INVENTION

One of the objects of this invention is to provide a low cost process for producing hardened, crush-resistant agglomerates from carbonaceous fines.

Another object of the invention is to provide a process capable of producing such agglomerates which are suitable as a charge for steel making processes.

A further object of the invention is to provide a process for producing hardened, crush-resistant agglomerates from low grade carbonaceous fines which are suitable for use as artificial coke or a low smoke, general purpose fuel.

Other objects, aspects and advantages of the invention will become apparent to those skilled in the art upon reviewing the following description and appended claims.

The process of this invention includes the steps of preparing a moistened mixture including a major proportion of carbonaceous fines having an average particle size less than −3 mesh, about 1 to about 15 weight % of a bonding agent, and about 0.25 to about 10 weight % of a siliceous material containing available $SiO_2$ for reacting with the bonding agent to form silicate or hydrosilicate bonds therewith, allowing the resulting mixture to stand a time period sufficient for a substantial portion of the free internal moisture in the pores of the carbonaceous fines to migrate to the surface thereof, forming the mixture into discrete, compact agglomerates, drying the green agglomerates to reduce the free moisture content therein to about 5 weight % or less, and hydrothermally hardening the agglomerates by contacting them with steam for a period of time sufficient to form them into hardened, integrally bonded masses.

The crush resistance or compressive strength of the hardened agglomerates can be increased further by drying them after the hardening step to remove substantially all of the free moisture therefrom.

DESCRIPTION OF THE PREFERRED EMBODIMENTS

As used herein, the term "carbonaceous fines" means finely divided particles of coke or coke breeze, bituminous coal, anthracite coal, lignite, bituminous and anthracite coal char, lignite char, wood char and the like containing more than 50 weight % carbon. Mixtures of two or more of these materials are encompassed by the term "carbonaceous fines".

A starting mixture is first prepared by thoroughly blending together carbonaceous fines, a finely-divided bonding agent, a finely-divided siliceous material and a sufficient amount of water to form a moistened material capable of being formed into discrete, agglomerated masses. If desired, the solid constituents of the starting mixture can be blended together in dry form and then moistened or added together with water and blended to form a homogeneous dispersion.

Acceptable bonding agents include the oxides, hydroxides and carbonates of calcium and magnesium and mixtures thereof, with burned lime, CaO, and hydrated lime, $Ca(OH)_2$, being preferred. The amount of bonding agent used is about 1 to about 15 weight %, based on the total weight of the dry solids. When less than about 1 weight % of bonding agent is used, the resultant hardened agglomerates have an unacceptably low crush resistance or compressive strength for handling or transportation. On the other hand, amounts of the bonding agent in excess of about 15 weight % do not appreciably increase the compressive strength of the hardened agglomerates and undesirably dilute their carbon content. The preferred amount of bonding agent used in the starting mixture is about 3 to about 10 weight %, based on the total weight of the dry solids.

The siliceous material used can be any natural or artificial siliceous material containing available $SiO_2$ for reacting with the bonding agent to form silicate or hydrosilicate bonds therewith under the conditions of the hydrothermal hardening step. Representative examples of acceptable siliceous materials include finely ground quartz, silica sand, bentonite, diatomaceous earth, Fuller's earth, sodium, calcium, magnesium and aluminum silicates, pyrogenic silica, various hydrated silicas, and mixtures thereof. Of these, finely ground quartz and silica sand are preferred.

The amount of siliceous material added to the starting mixture can be about 0.25 to about 10 weight %, preferably about 1 to about 3 weight %, based on the total weight of the dry solids. When amounts of siliceous material less than about 0.25 weight % are used, hardened agglomerates having compressive strengths of about 125 pounds or higher generally cannot be obtained within practically reasonable hardening times. On the other hand, amounts more than about 10 weight % do not appreciably increase the compressive strength and can undesirably dilute the carbon content.

The amount of water included in the starting mixture varies, depending on the particular agglomeration technique employed. For example, when a pelletizing process employing a drum or disc is used to form spherical pellets, the total amount of water in the moistened starting mixture generally should be in the range of about 10 to about 20 weight %, preferably about 15 to about 17 weight %. On the other hand, when a briquetting press is used, the amount of water in the moistened starting mixture generally should be about 5 to about 15 weight %, preferably about 8 to about 10 weight %.

The average particle size of the carbonaceous fines should be less than about $-3$ mesh and preferably ranges from about 200 to about 400 mesh. Generally, the average particle size of the bonding agent and the siliceous material is about 200 to 400 mesh. Preferably, at least half of all the solid materials in the starting mixture have an average particle size less than about 325 mesh.

Carbonaceous fines generally have many small capillary-like pores or cavities. During the mixing step, water tends to be absorbed into these pores or cavities. This free internal moisture is converted to steam during the hydrothermal hardening step, causing a substantial reduction in the compressive strength of the hardened agglomerates, and cracking or bursting in some cases, when excessive amounts are present in the pores or cavities. The problem is minimized by allowing the moistened mixture, prior to agglomeration, to stand a time period sufficient for a substantial portion of the free internal moisture in the pores of the carbonaceous fines to migrate to the surface.

The time and conditions for this step can vary considerably and depend primarily upon the particular type of carbonaceous fines and bonding agent being used. For instance, pyrolyzed fines, such as coke fines and bituminous coal char fines, generally are more porous than bituminous or anthracite coal fines and tend to absorb more moisture. Accordingly, a longer standing time is required for pyrolyzed fines. This step can be performed at ambient temperature because it is not necessary to actually remove moisture from the mixture; however, the desired migration of excess moisture from the pores of the carbonaceous material can be accelerated by heating the moistened mixture to an elevated temperature.

When lime and/or magnesium oxide is used as the bonding agent, they react with the moisture present in the mixture to form hydrates. This exothermic hydration reaction tends to accelerate migration of the moisture from the pores of the carbonaceous fines, resulting in a shortening of the standing time required without external heating.

As a general guide, the moistened mixture is allowed to stand at or about ambient pressure for about 1 to 48 hours, preferably about 2 to about 3 hours, at or about ambient pressure and at a temperature of about 60° to about 90° C. Higher temperatures and pressures can be used, but are less desirable because of higher operational costs. When lime or magnesium oxide is used as the bonding agent, the moistened mixture preferably is placed in a closed, thermally insulated container to take advantage of the exothermic hydration reaction.

Strengthening additives can be included in the starting mixture to further increase the strength of the hardened agglomerates. For example, finely divided iron ore in amounts up to about 50 weight %, based on the total weight of the dry solids, can be added for this purpose. Agglomerates containing both carbonaceous fines and iron ore fines are particularly adaptable for use in a charge to a steel making process.

The moistened mixture is next formed into green agglomerates of the desired size and shape for the intended end use by a conventional agglomeration technique, such as molding, briquetting, pelletizing, extruding, and the like. Pelletizing with a balling disc or drum is preferred because of the lower operating cost. The green agglomerates preferably are formed into relatively compact configurations, such as cylinders, spheres, egg shapes, pillows, etc., and are substantially devoid of any thin sections or sharp angularity which might be susceptible to fracture or breakage during handling or transportation. The configuration of the agglomerates is also controlled so they do not become tightly compacted when stacked together and thereby prevent the passage of a heated moisture-laden fluid therebetween during the subsequent hydrothermal hardening step. When in the form of spherical pellets, the green agglomerates generally have a diameter of about 5 to 50 mm., preferably about 10 to about 25 mm. When briquetting is used, the agglomerates preferably are in a pillow or egg shape and have a diameter ranging up to about 75 mm. Larger pellets and briquettes can be used if desired.

In order to obtain hardened agglomerates having an acceptable crush resistance or compressive strength, the green agglomerates are dried to a free moisture content of about 5 weight % or less, preferably about 3 weight % or less, prior to the hydrothermal hardening step. This drying can be accomplished by conventional means, such as by placing the green agglomerates in an oven or by blowing a hot gas thereover, using drying temperatures up to the decomposition temperature of the carbonaceous material. The time required to reduce the free moisture content of the green agglomerates to about 5 weight % or less depends upon the drying temperature used, the moisture content of the green agglomerates, the level to which the moisture content is reduced, size and shape of the green agglomerates, etc. If desired, the green agglomerates can be dried to a substantially bone dry condition and then sprayed with sufficient water to raise the moisture content to the desired level.

After the green agglomerates have been partially or completely dried, they are introduced into a reaction chamber or pressure vessel, such as an autoclave, wherein they are heated to an elevated temperature in the presence of moisture to effect a hardening and bonding of the individual particles into an integral, high-strength mass. The compressive strength of the hardened agglomerates produced by this hydrothermal hardening step depends to some extent upon the temperature, time and moisture content of the atmosphere used.

The application of heat to the green agglomerates can be achieved by any one of a number of methods. The use of steam is preferred because it simultaneously provides a source of heat and moisture necessary for the hydrothermal reaction. Either saturated steam or substantially saturated steam can be used. Superheated steam tends to produce hardened agglomerates having reduced strengths. Therefore, steam at temperatures and pressure at or close to that of saturated steam is preferred. Temperatures generally ranging from about 100° to about 250° C., preferably about 200° to about 225° C., can be satisfactorily employed to achieve the desired hardening of the green agglomerates within a reasonable time period.

Autoclaving pressures substantially above atmospheric pressure are preferred in order to decrease the hardening time and to improve the strength of the resultant hardened agglomerates. Generally, economic conditions dictate that the maximum pressure should not exceed about 35 atmospheres and a pressure of about 10 to about 25 atmospheres is preferred.

The retention time of the agglomerates in the reaction chamber or pressure vessel depends upon several process variables, such as pressure, temperature, and atmosphere of the chamber, composition of the agglomerates, etc. In any case, this time must be sufficient to obtain hardening and bonding of the individual particles into a hardened, high strength condition. When higher temperatures and pressures are used, the time for the hydrothermal hardening step generally is about 5 minutes to about 8 hours, preferably about 30 to about 60 minutes.

The hardened agglomerates are removed from the reaction chamber and, upon cooling, are ready for use. The hot, hardened agglomerates usually contain up to about 1.5 weight % free moisture and have compressive strength characteristics suitable for most uses. The compressive strength of the hardened agglomerates can be increased significantly by rapidly drying them, preferably immediately after removal from the reaction chamber and before appreciable cooling has occurred, to remove substantially all of the free moisture therefrom. This drying can be accomplished in any convenient manner, such as by placing the hot, hardened agglomerates in an oven or by blowing a hot gas thereover. Generally, a temperature of about 100° to about 350° C., preferably about 150° to about 250° C., can be used for this post-hardening drying step.

The following example is presented to illustrate a preferred specific embodiment of the invention and should not be construed as limiting the invention.

EXAMPLE

A series of tests was run to evaluate the crush resistance, or compressive strength, of hardened agglomerates formed from −200 mesh coke fines in accordance with the invention. In these tests varying amounts of CaO, $SiO_2$ and water were used in starting mixture. The ingredients were blended together in a pan mixer for about 2 minutes. The resulting mixture was placed in a closed container and stored at 80° C. for 2 hours. Green spherically-shaped pellets (some ¾ inch diameter and others 1½ inch diameter) were prepared from the mixtures in a conventional balling device. The green pellets were dried to a moisture content of about 1 weight % by drying in an oven at a temperature of about 110° C. for about 60 minutes. Dried pellets from each batch were then placed in a 5-liter Cenco-Menzel high pressure autoclave containing 1.5 liters of boiling water. The autoclave was heated to and maintained at a temperature of 215° C. and a pressure of 22 atm. Hardened pellets from each batch were removed from the autoclave after different retention times and dried in an oven at a temperature of about 110° C. for about 30 minutes to remove substantially all of the free moisture therefrom. After cooling, the compressive strength of the pellets was measured with a Dillon spring tester. Results from these tests are summarized below in Table I.

Similar results have been obtained with bituminous coal fines and bituminous coal char.

TABLE I

| | Compressive Strengths of Pellets Containing Varying Amounts of Binding Agent & Siliceous Material | | | | | | | |
|---|---|---|---|---|---|---|---|---|
| | Composition Of Starting Mixture, Wt. % of Dry Solids | | | | Compressive Strength, lbs. At Different Retention Times | | | |
| Run | CaO | $SiO_2$ | Water | Pellet Size, in. | 1 hr. | 3 hr. | 5 hr. | 6 hr. |
| 1 | 7 | 3 | 16.45 | ¾ (19 mm) | 191 | 260 | 373 | — |
| 2 | 7 | 0 | 16.25 | ¾ (19 mm) | 83 | 109 | 110 | — |
| 3 | 3.5 | 1.5 | 17.16 | ¾ (19 mm) | 128 | 162 | 147 | — |
| 4 | 3.5 | 1.5 | 17.20 | 1½ (38 mm) | 291 | 357 | — | 480 |

From these results, it can be seen that hardened pellets having compressive strengths in excess of 125 lbs. can be produced from coke fines in accordance with the invention with a relatively low pressure and temperature and a retention time as short as 1 hour. The presence of reasonable amounts of lime in the hardened agglomerates is not detrimental for many end uses and, in fact, can be beneficial. For instance, lime is used as a fluxing agent in steel-making processes, e.g. blast furnace and cupola processes. Also, lime is a sulfur-absorbing agent which can be advantageous when fines of sulfur-containing coals are agglomerated and used as a fuel. That is, sulfur dioxide, which normally must be removed from the stack gas, is at least partially removed at the site of combustion by the lime present in the agglomerates and is collected along with the ashes. Char fines produced from non-coking coals, lignite and wood can be agglomerated by the process of the invention and used as an artificial coke or a general purpose, low smoke fuel.

From the foregoing description, one skilled in the art can easily ascertain the essential characteristics of this invention and, without departing from the spirit and scope thereof, can make various changes and modifications to adapt the invention to various uses and conditions.

I claim:

1. A process for agglomerating carbonaceous fines having an average particle size less than about −3 mesh into hardened, high strength masses including the steps of
    (a) preparing a moistened mixture including a major proportion of the carbonaceous fines, about 1 to about 15 weight % of a bonding agent selected from the group consisting of the oxides, hydroxides and carbonates of calcium and magnesium, and mixtures thereof and about 0.25 to about 10 weight % of a siliceous material containing available SiO$_2$ for reacting with said bonding agent to form silicate or hydrosilicate bonds therewith, the weight percentages being based upon the total weight of the dry solids in said mixture;

(b) allowing said moistened mixture to stand a time period sufficient for a substantial portion of the free internal moisture in the pores of the carbonaceous fines to migrate to the surface thereof;

(c) forming discrete, agglomerates from said moistened mixture;

(d) drying said agglomerates to reduce the free moisture content therein to about 5 weight % or less; and (e) hydrothermal hardening said agglomerates by contacting them with steam at a temperature of about 100° to about 250° C. for a time period sufficient to form them into hardened and integrally bonded masses.

2. A process according to claim 1 including the further step of (f) drying said hardened agglomerates after step (e) to remove substantially all of the free moisture therefrom.

3. A process according to claim 1, wherein said bonding agent is burned lime or hydrated lime.

4. A process according to claim 3 wherein said mixture contains about 3 to about 10 weight % burned lime or hydrated lime and about 1 to about 3 weight % silica.

5. A process according to claim 1 wherein step (b) is carried out at a temperature of about 60° to about 90° C. for a time period of about 1 to about 48 hours.

6. A process according to claim 1 wherein step (e) is carried out at a steam pressure ranging up to about 35 atm.

7. A process according to claim 6 wherein step (e) is carried out at a temperature of about 200° to about 225° C. and at a steam pressure of about 10 to about 25 atmospheres.

8. A process according to claim 1 wherein the free moisture content of said masses is reduced to about 3 weight % or less during step (d).

9. A process for agglomerating materials of carbonaceous fines having an average particle size less than about −3 mesh into hardened, high strength masses including the steps of (a) preparing a moistened mixture including a major proportion of the carbonaceous fines, about 1 to about 15 weight % calcium oxide or calcium hydroxide, and about 0.25 to about 10 weight % silica, the weight percentages being based on the total weight of the dry solids in said mixture;

(b) allowing said moistened mixture to stand a time period sufficient for a substantial portion of the free internal moisture in the pores of the carbonaceous fines to migrate to the surface thereof;

(c) forming discrete, agglomerates from said moistened mixture;

(d) drying said agglomerates to reduce the free moisture content therein to about 3 weight % or less; and (e) hydrothermally hardening said agglomerates by contacting them with steam at a temperature of about 200° to about 225° C. and a pressure of about 10 to about 25 atmospheres for about 5 minutes to about 8 hours.

10. A process according to claim 9 wherein said mixture includes about 3 to about 10 weight % calcium oxide or calcium hydroxide and about 1 to about 3 weight % silica.

11. A process according to claim 9 wherein step (b) is carried out at a temperature about 60° to about 90° C. for a time period of about 1 to about 48 hours.

* * * * *